Nov. 25, 1958 J. L. RUSSELL 2,862,084

CAPTIVE SHIELD AND CIRCUIT COMPONENT EMBODYING THE SAME

Filed June 14, 1955

United States Patent Office 2,862,084

Patented Nov. 25, 1958

2,862,084

CAPTIVE SHIELD AND CIRCUIT COMPONENT EMBODYING THE SAME

John L. Russell, Naugatuck, Conn., assignor to The Bristol Company, Waterbury, Conn., a corporation of Connecticut Application June 14, 1955, Serial No. 515,305

8 Claims. (Cl. 200—168)

This invention relates to shields for electric circuit components, and more especially to a captive shield for an electrical device adapted to be removably plugged into a stationary receptacle forming a part of an electrical or electronic chassis. In order to obtain satisfactory and consistent performance from many circuit devices, especially when installed in close proximity to other electrical apparatus, it is essential that each such device be provided with suitable electrostatic and/or magnetic shields. Where electrostatic shielding only is required such may be accomplished by substantially enclosing the component to be shielded in an electrically conducting shell; and while such a shell will provide a certain degree of shielding from the effects of alternating magnetic fields, especially at high frequencies, complete magnetic shielding requires that the shell be constructed of material having high magnetic permeability.

In the shielding of removable components such as electron emissive devices and other components characterized by sensitivity to, or acting as sources of, undesired stray fields, it is customary to provide a shell adapted to enclose said component and to be removable from the assembly at any time it may be necessary to remove the component for inspection or replacement. Such a practice is exemplified in the combination of the JAN base-shield-type socket and the JAN type shield adapted for attachment thereto by means of a bayonet joint.

Certain of said components are characterized by internal fields whose conformation or geometry is an essential element in the functioning of the apparatus, and wherein it is required that an associated shield not only inhibit inductive coordination between parts interior and exterior thereto but also control and maintain the distribution of said internal fields as established by design and adjustment, and in a manner to facilitate optimum performance of coacting members. An example of such a circuit component is found in an electrically actuated contacting device fully set forth and described in my copending application executed simultaneously herewith, Serial No. 515,373, filed June 14, 1955, and assigned to the assignee of the present application. Said device, while not electronic in its nature, is in its use generally installed in juxtaposition to electronic apparatus, and is adapted for plug-in connection into standard sockets and receptacles, such as the hereinbefore mentioned JAN base. As pointed out in said copending application, the operation of said contacting device is dependent upon an internally produced magnetic field, and for optimum performance it is essential that the distribution of said field be precisely established and maintained. It is shown that for this purpose use may be made of a suitable shield formed of ferromagnetic material and juxtaposed in predetermined relationship to the magnetic system of the internal mechanism.

In various electrical and electronic devices, especially the contactor described in said copending application, delicate adjustments are essential to satisfactory functioning of the apparatus; and since some of these are appreciably affected by distribution of fields, it becomes necessary that each unit be coordinated with its individual shield, and that when such adjustments are completed each device be permanently "paired" with its shield, thus minimizing the possibility of loss of adjustment after a device has been removed from, and replaced in, its socket.

Furthermore, it has been found that, when such a device as said electrically actuated contactor is adjusted in combination with its ferromagnetic shield, removal and subsequent replacement of the shield may result in irreversible changes in flux distribution, whereby the adjustments are permanently disturbed.

It, therefore, is an object of the present invention to provide for removable electrical components in general and for electrically actuated contactors of the type described in particular, shielding means which, while removable and replaceable with said component, remains positively interlocked with the component and may not become inadvertently separated therefrom, and possibly interchanged with others.

It is a further object to provide with such shielding means a sealing device whereby, should separation become essential, there is provided a positive indication that such severance has taken place.

Further objects, as well as advantages of this invention, will be apparent from the following description and the accompanying drawings in which.

Figure 1:
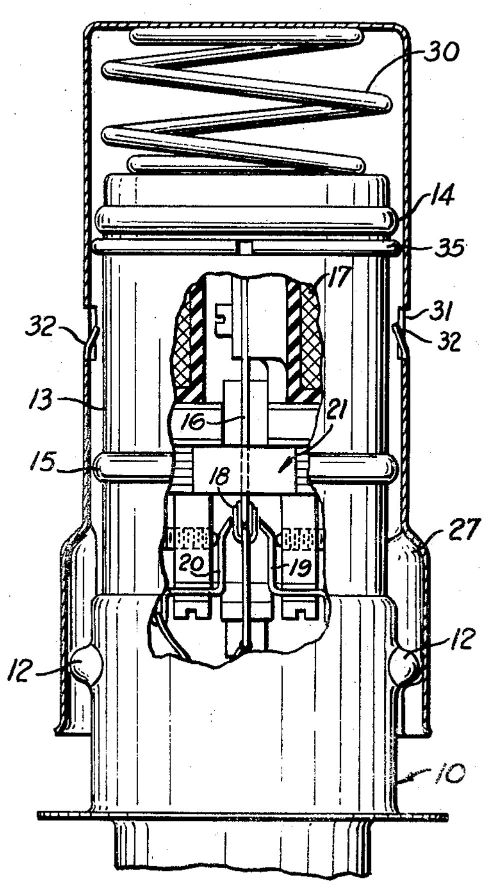
Figure 1 is a side elevation, partly in section, of a removable electrical component in combination with a shield embodying the principle of the invention.
Figure 2:
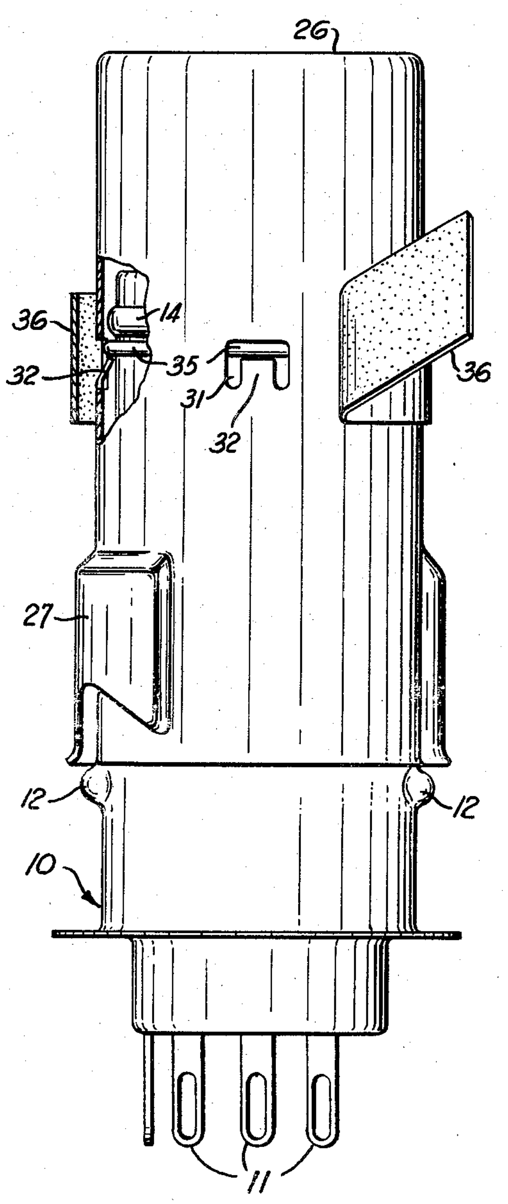
Figure 2 is a similar elevation, also partly in section, of the same elements as shown in Figure 1, but in a different relative position.

Referring now to the drawings, a conventional cylindrical socket or receptacle 10 is adapted for mounting on the chassis of an electrical or electronic assembly, and is provided with terminals 11 whereby connection may be made to conductors of an associated circuit. Receptacle 10 has formed thereon diametrically opposed bosses 12 adapted to be engaged by the conformed surface of a member hereinafter to be set forth whereby to provide therewith a bayonet joint.

An electrical component or circuit device has a casing or envelope 13 adapted to be removably plugged into the receptacle 10 by prongs or leads, not shown in the drawings, and whereby separable electrical connection will be made between elements within said casing and the terminals 11. The casing 13 is formed of thin sheet metal, cylindrical in shape, and having a closed end at the extremity remote from the mounting base. Formed about the periphery of the casing 13, near said extremity, and having a substantially semicircular section, is an outwardly projecting annular boss or ridge 14, the principal purpose of which will presently be explained. For the purpose of stiffening or reinforcement, a similar ridge 15 may be formed about the periphery of the casing between the ridge 14 and the mounting base.

In the present instance, the electrical component shown is of the type described and claimed in said copending application and comprises an armature 16 one portion of which is encircled by winding 17 while another portion projects through an air-gap and carries a contact 18 deflectable therewith into engagement with oppositely disposed fixed contacts 19, 20. The air-gap is formed by means indicated generally at 21 for establishing a substantially constant transverse magnetic field. As previously indicated hereinabove, a ferromagnetic shell, to be described, serves among other things to maintain the desired distribution of the internal fields developed by magnetic field-producing means 21 and winding 17.

In accordance with the present invention, shield 26 may conform generally to the shape of the component it is intended to enclose but is selected to have substantially greater length than the component, and also to have such excess diameter as to provide an appreciable annular space between its inner wall and the outer surface of the casing 13. Shield 26 is provided with an internally grooved portion 27 adapted to cooperate with the bosses 12 in establishing a bayonet joint with the receptacle 10. As shown in Figure 1, a compression spring 30 is positioned in the end space between the shield and the casing, whereby to take up lost motion and also to maintain the bayonet joint in locking engagement.

Circumferentially spaced about the cylindrical part of the shield 26 and in a zone intermediate its extremities, are formed several (e. g. four) inverted U-shaped openings 31 as viewed in the drawings, each providing a tongue portion 32 extending toward the closed extremity of the shield. The tongues 32 are utilized as follows: In assembly, the shield 26 containing the spring 30 is placed over the component to be shielded and forced down until the openings 31 pass beyond the ridge 14. The tongues 32 are then bent inward, as indicated, so that their respective tips approach the wall of the casing 13, and extend radially inwardly of the maximum diameter of the ridge 14. The axial positioning of the openings 31 and tongues 32 with respect to the body of the shield 26 is made such that when the shield is withdrawn sufficiently to clear the bosses 12, the inwardly projecting tongues 32 engage the lower or inner edge of the ridge 14, making it impossible to withdraw the shield any further without also removing the shielded component from its socket. At the same time there is introduced no interference with such angular motion of the shield as may be necessary for effective locking and releasing of the bayonet joint.

Figure 3:
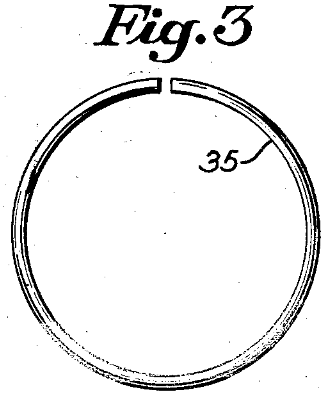
Figure 3 is a detail of a member shown in Figures 1 and 2.

Since manufacturing limitations may render it difficult or impracticable to form the ridge 14 without such obliquity as may under axial pressure tend to open the tongues 32 and allow them to ride over its surface, thus freeing the shield and defeating the purpose of the invention, it has been found advantageous to supplement the function of said ridge by a more positive means of engagement. This is accomplished by providing a ring 35 shown most clearly in Figure 3, formed of spring wire stock having a diameter somewhat less than the width of the annular space between the outside of the casing 13 and the inside of the shield 26. Said ring is open at one point, and before assembly is slipped over the closed extremity of the casing 13 and sprung over the ridge 14, to grip said casing immediately adjacent thereto. By virtue of the small radius of curvature of the wire stock comprising the ring 35, any effort to force the tongues 32 against the same will produce on the tips of the latter a reaction tending to bend them inward and render more positive the engagement between the shield and the casing.

Sealing of the assembly may be effected by means of a strip or band 36 adapted to surround the shield in the zone containing the openings 31, covering and concealing said openings and the tongues 32, and being secured to said shield as by an adhesive or by soldering. By suitably designing, and selecting the material for said sealing strip, it may be rendered of such a nature that, while not difficult of removal should emergency conditions demand immediate access to the device within, it cannot be replaced without definite indication that such removal has taken place.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. An electric circuit component, comprising, in combination, a tubular casing having a radially outward projection formed thereon spaced from one end thereof, a tubular shield member enclosing said casing and having at least one radially inwardly extending tongue formed thereon, said tongue extending in axial registration with and spaced a predetermined distance from said projection between said projection and said one end of said casing and limiting relative axial displacement between said shield member and said casing in one direction to said distance.

2. An electric circuit component, comprising, in combination, a tubular casing having a radially outward projection formed thereon spaced from one end thereof, means for producing a magnetic field within said casing, and magnetic circuit means comprising a ferromagnetic tubular member open at one end and enclosing said casing, said tubular member having at least one tongue formed thereon and extending radially inwardly, said tongue being in axial registration with and spaced a predetermined distance from said projection between said projection and said one end of said casing, said tubular member being free for angular displacement relative to said casing, and said tongue limiting relative axial displacement between said tubular member and said casing in one direction to said distance, whereby said casing is normally retained in said tubular member.

3. An electric circuit component, comprising, in combination, a tubular casing having a radially outward projection formed thereon, a receptacle having a part adapted to form an element of a rotary locking joint, said casing being adapted at one end thereof for plug-in engagement by a straight axial motion into said receptacle, a tubular shield member enclosing said casing and having at least one radially inwardly extending tongue in axial registration with and spaced a predetermined distance from said projection between said projection and said one end of said casing, said shield member being free for rotation about said casing and having a part formed thereon releasably engaging said first mentioned part on said receptacle, said tongue limiting relative axial displacement between said shield member and said casing in one direction to said distance whereby said casing is normally retained in said shield member.

4. An electric circuit component, comprising, in combination, a tubular casing, a radially outward projection on said casing spaced from one end thereof, means for producing a magnetic field within said casing, a receptacle having a part adapted to form an element of a rotary locking joint, said casing being adapted at said one end thereof for plug-in engagement by a straight axial motion into said receptacle, and magnetic circuit means comprising a ferromagnetic tubular member open at one end and enclosing said casing, at least one radially inwardly extending tongue on said tubular member in axial registration with and spaced a predetermined distance from said projection between said projection and said one end of said casing, said tubular member being rotatable about said casing and having a part formed thereon complementary to and releasably engaging said first mentioned part on said casing, said tongue limiting relative axial displacement between said shield member and said casing in one direction to said distance whereby said casing is normally retained in said shield member when said casing is removed from said receptacle.

5. An electric circuit component, comprising, in combination, a cylindrical casing having a circumferentially extending ridge formed thereon spaced from one end thereof, said ridge having a predetermined radius of curvature axially relative to said casing, an annular member encircling said casing adjacent to said ridge and on the side thereof toward said one end of said casing, said annular member having a radius of curvature axially relative to said casing less than said predetermined radius of curvature, a cylindrical tubular shield member enclosing said casing, at least one radially inwardly extending tongue on said shield member in axial registration with and spaced a predetermined distance from said annular member and between said annular member and said one end of said casing, said shield member being free for angular displacement relative to said casing, said tongue limiting relative axial displacement between said tubular member and said casing in one direction to said distance, whereby said casing is normally retained in said tubular member, and telltale means exteriorly mounted on said casing in the region of said tongue for indicating shifting of said tongue and thereby removal of said casing from said shield member.

6. In combination, apparatus having an elongated cylindrical casing and axially extending connection means, a receptacle adapted to have said connection means plugged thereinto by a straight axial motion, an external part on said receptacle adapted to form an element of a rotary locking joint, a metallic shield for said apparatus, adapted to enclose the same and having a part adapted to cooperate with that on said receptacle to complete said locking joint, an annular projection on said casing and inwardly projecting tongues on said shield axially spaced a predetermined distance from and adapted to engage said projection, whereby, while permitting relative angular displacement between said casing and said shield, to limit relative axial displacement between the same to said distance.

7. A shield for use with an electric circuit component having predetermined axial and radial dimensions with a radially outward projection formed thereon and adapted at one end thereof for plug-in engagement by a straight axial motion into a receptacle having a part adapted to form an element of a rotary locking joint, comprising a tubular member having radial and axial dimensions such that it may slip over said circuit component, a part formed on said tubular member adjacent an open end thereof for completing said locking joint, and radially inwardly deformable tongues formed on said tubular member for engagement with said outward projection, said tongues being positioned on said tubular member so that when radially inwardly deformed they are in axial registration with and spaced a predetermined distance from said projection on the side thereof toward said one end of said casing to permit relative angular displacement between said tubular member and said circuit component and to limit relative axial displacement between said tubular member and said casing to said distance whereby said casing is normally retained in said tubular member.

8. An electric circuit component as set forth in claim 1 wherein said projection is arcuate, and an annular member encircles said casing adjacent to said projection and between said projection and said tongue, said annular member having a radius of curvature axially relative to said casing less than the curvature of said projection.

References Cited in the file of this patent

UNITED STATES PATENTS

| | | |
|---|---|---|
| 1,449,433 | Munson | Mar. 27, 1923 |
| 2,043,746 | Garstang | June 9, 1936 |
| 2,140,792 | Dressel et al. | Dec. 20, 1938 |
| 2,190,685 | Slater | Feb. 20, 1940 |
| 2,256,257 | Dukehart | Sept. 16, 1941 |

FOREIGN PATENTS

| | | |
|---|---|---|
| 377,069 | Italy | Dec. 7, 1939 |